United States Patent [19]
Rettenbacher

[11] Patent Number: 5,916,503
[45] Date of Patent: Jun. 29, 1999

[54] PROCESS AND DEVICE FOR PRODUCING MOLDINGS, IN PARTICULAR FOR STRUCTURAL ELEMENTS, INSULATIONS AND/OR PACKAGING, AND MOLDINGS SO OBTAINED

[75] Inventor: Markus Rettenbacher, Parkstrasse 1/8, Salzburg A 5020, Austria

[73] Assignee: Markus Rettenbacher, Puch, Austria

[21] Appl. No.: 07/777,350

[22] PCT Filed: Jun. 5, 1990

[86] PCT No.: PCT/AT90/00054

§ 371 Date: Feb. 3, 1992

§ 102(e) Date: Feb. 3, 1992

[87] PCT Pub. No.: WO90/14935

PCT Pub. Date: Dec. 13, 1990

[30] Foreign Application Priority Data

Jun. 7, 1989 [AT] Austria .................................. 1392/89

[51] Int. Cl.[6] ............................ B29C 44/20; B29C 44/28
[52] U.S. Cl. ....................... 264/45.3; 264/45.9; 264/46.1; 264/46.2; 264/53; 264/122; 264/112; 425/4 C; 425/208; 425/325
[58] Field of Search ............................ 264/41, 112, 45.3, 264/46.1, 109, 122, 53, 128, 45.9, 46.2; 425/325, 4 C, 208

[56] References Cited

U.S. PATENT DOCUMENTS

| | | | |
|---|---|---|---|
| 3,223,576 | 12/1965 | Evans et al. | 264/45.8 |
| 3,716,449 | 2/1973 | Gatward et al. | 162/315 |
| 3,758,660 | 9/1973 | Battista | 264/126 |
| 4,185,060 | 1/1980 | Ladney, Jr. | 425/208 |
| 4,243,480 | 1/1981 | Hernandez et al. | 162/146 |
| 4,357,194 | 11/1982 | Stofko . | |
| 4,508,595 | 4/1985 | Gasland | 264/54 |
| 4,607,797 | 8/1986 | Enikolopow et al. | 425/208 |
| 4,613,627 | 9/1986 | Sherman et al. | 264/50 |
| 4,627,951 | 12/1986 | Shen . | |
| 4,881,690 | 11/1989 | Maier | 241/82.3 |
| 5,153,037 | 10/1992 | Altieri | 264/53 |
| 5,185,382 | 2/1993 | Neumann et al. | 264/53 |
| 5,186,990 | 2/1993 | Starcevich | 264/53 |
| 5,277,852 | 1/1994 | Spydevold | 425/4 C |

FOREIGN PATENT DOCUMENTS

| | | |
|---|---|---|
| 113595 | 12/1983 | European Pat. Off. . |
| 201625 | 9/1985 | European Pat. Off. . |
| 3641466 | 6/1988 | European Pat. Off. . |
| 477203 | 9/1993 | European Pat. Off. . |
| 1704754 | 5/1971 | Germany . |
| 1653263 | 11/1971 | Germany . |
| 48-027915 | 8/1973 | Japan ..... 264/45.3 |
| 57-20070581 | 12/1982 | Japan . |
| 57-207058 | 12/1982 | Japan ..... 264/45.3 |
| 59-078839 | 5/1984 | Japan ..... 264/45.3 |
| 59078839 | 5/1987 | Japan . |
| 62-286715 | 12/1987 | Japan ..... 264/45.3 |
| 405685 | of 1966 | Switzerland . |

OTHER PUBLICATIONS

Patent Abstracts of Japan "Unexamined Applications" vol. 8, No. 22, Jan. 31, 1984.

*Primary Examiner*—Allan R. Kuhns
*Attorney, Agent, or Firm*—Oliff & Berridge, PLC

[57] ABSTRACT

The invention relates to a process for the manufacture of new shaped parts, preferably made from chipboards, wherein a mass formed from at least a binder and a small-particled material brought into contact with this binder is subjected to extrusion at elevated temperature and pressure. In the process according to the invention, a mass possessing a total moisture content of 6 to 25 wt. % or adjusted to the stated moisture content and made up of at least one biopolymeric preferably starch-containing binder, which converts into a melt and/or gel at extrusion temperatures and pressures, and further made up of the small-particled material, is subjected to extrusion and immediately thereafter undergoes decompression and spontaneous expansion. A device for carrying out the process according to the invention is also disclosed, and includes extrusion equipment for lump-sized starting components having a processing zone arranged upstream of an extrusion nozzle for carrying out partial decompression, thereby causing partial internal expansion of the mass being processed.

52 Claims, 1 Drawing Sheet

PROCESS AND DEVICE FOR PRODUCING MOLDINGS, IN PARTICULAR FOR STRUCTURAL ELEMENTS, INSULATIONS AND/OR PACKAGING, AND MOLDINGS SO OBTAINED

BACKGROUND OF THE INVENTION

1. Field of the Invention

The subject of the invention is a process for the production of new shaped parts used for the production of construction material, structural material or packaging material, preferably made from wood chip and/or fibre-based sections and/or boards, also the equipment for producing the parts and the use of the said parts.

2. Description of the Related Art

Many procedures are known by means of which biopolymeric products may be broken down in order to process them in a separate, second work step into other products, e.g. wood-fibre boards. The biopolymeric products are broken down by the application of steam followed by decompression or mechanical comminution. Usually a combination of these two methods is used. The serious drawbacks of both these processing methods are that they require high inputs of energy and also that the intermediate products obtained can only be processed in batches.

Other processes are known in which a mass consisting of resin and wood chips is extruded to produce structural boards. Specially designed extruders, and especially extruder screws, have to be used for this purpose. In most cases, only semi-finished products are produced and no attempt is ever made to produce the final product in one single operation. The expense involved in having to provide separate machinery for the final products adds to the expense of the boards, wall elements, etc. which are extruded on the known machinery.

Reference is made here to German Patent Application DE-A1 1 653 263 which can stand as an example of the known extrusion processes for producing boards and sections from material containing lignocellulose. According to that Patent Application, wet raw material in the form of chips is first dried in the drying mixer to the desired moisture content then mixed with glue in at least one mixer, and only after a binder—specific materials are mentioned in the Patent Application—is applied in a separate wetting step is the raw material continuously extruded in a screw extruder while continuously adjusting the pressure and while also regulating the temperature, to form the finished product.

For the manufacture of a cigarette-like product, the concept is known of compressing a moist mixture of natural fibre-shaped material and starch in an extruder until the starch melts to form a gel which is then allowed to expand to give a foam-like product made of biodegradable substances, cf. EP-A 113 595.

Furthermore, it is known from US-A 4 357 194, that a mixture of natural fibre-shaped or fibre-containing material and starch or sugar may be compacted and heated with steam in order to obtain particle boards made from biodegradable substances, without using artificial glue (adhesives). In addition, US-A 4 627 951 describes processes by means of which natural, sugar-containing, fibre-shaped material may be compressed in heatable board-pressing machines, without steam and without the addition of glue, to obtain particle boards made of biodegradable substances.

The disadvantage of the chipboards produced by the known procedures is that they have a high density which makes them heavy and awkward to handle when they are used, for example, in the construction of small items of furniture; furthermore, they are not very well suited for use in thermal insulation applications e.g. as floor, wall and ceiling boards, attic lining materials etc.

Another large area is accounted for by the production of insulation boards—preferably of low density—from foamed plastics, which vary widely in their properties, whose porosity is obtained by gas-generating primary components or additives The disadvantages of such products are that their mechanical strength declines rapidly at low density, they melt and burn easily their resistance to chemicals is inadequate and, last but not least, they do not break down readily once they are disposed of as waste. What is more, the above-described fibre boards can also cause environmental problems right at the manufacturing stage, due to the chemicals used, as well as later when they are employed in their intended applications.

SUMMARY OF THE INVENTION

The purpose of the invention is to avoid the disadvantages of the already known processes and products in this sector, while using the customary extrusion machinery, but without the separate prior application of glue to the chip or fibre material, and to create a process which permits the products mentioned at the beginning of this application to be produced in essentially one single operation from environmentally friendly raw materials. The aim is to obtain products which exhibit a greater degree of isotropy and thus have more uniform physical properties than the previously known boards, and which also combine lower density with greater mechanical stability.

In the process according to the invention, the new products are obtained in a particularly advantageous manner.

In this connection, it is particularly important to form a genuine molten gel by applying heat and pressure so that the preferably starch-containing materials or other binder materials capable of forming a melt—such materials may also include starch itself—may be fed directly into the extruder, after the desired moisture content has been adjusted, in solid, lump form, such as whole rice grains, possibly together with the husks which serve as the fibre material component, or simply uniformly mixed with the other biogenic chip or fibre material, e.g. wood chips, straw, cardboard, paper and similar. The products can thus be produced in practically one operation. Apart from the chipped, comminuted, defibrated, fibre-like, fibre-containing and fibre-shaped materials referred to above, the biogenic high-molecular materials also include materials such as rubber and similar which also possess fibre-like molecules.

By converting the binder, which is added in solid form, into a molten gel consistency, it is possible, despite the expansion which immediately takes place, to process the material without any difficulty on a wide range of different types of extruder. The product is smoothed by binding the biogenic materials used, e.g. wood chips, into this highly viscous phase. The process is easy to control and yields products having a pleasing surface finish, low density and high strength. The formation of this gel-like consistency can also be promoted by additives, e.g. agents which cause cellulose to swell or dissolve, which do not themselves possess the ability to gel, but which bring it about in one of the other components, e.g. in the wood chips, when the material is intensively worked in the extruder.

The new products obtained by the process according to the invention offer the special advantage that their specific mass can be controlled by varying the degree of expansion, which can be influenced over a wide range via the pressure and heat applied, and in this way a much lighter wood-fibre board can be produced which is only slightly less strong than other fibre boards.

Immediately after the product emerges from the extruder, which can be fitted with any desired shape of extrusion nozzle, in particular a flat nozzle, the gel, especially a starch gel, starts to make the transition into a glassy state as it cools, while simultaneously the steam generated by the water vapour trapped in the extrusion mass undergoes expansion. By adjusting the moisture content, starch component, biopolymer content and the operating conditions, these two competing processes can be precisely matched to one another in order to obtain outstanding final products. One last major advantage is that the final product can be made to expand to the desired density without the need for additional gas-generating or gas-releasing chemicals, but simply via the moisture content of the extrusion mass, e.g. of the wood chips and/or the starch.

The invention can also be particularly advantageously used for the manufacture of packaging filler materials and throw-away thermal insulating containers, e.g. for snack foods, etc. The products obtained by this process are characterized by their pleasing appearance to the consumer; they also possess good shock-absorbing and elastic properties, which are particularly important when the products are used as fillers, e.g. chips or spheres, in packages, or also when they are used as wrapping elements or foils. Another advantage is their "crisp" consistency, which makes it much easier to comminute them, e.g. for waste disposal purposes, and thus also enhances their biodegradability.

When the method according to the preferred embodiment is used, the starch is employed as the binder and can be at least partially replaced by starch containing plant parts taken from the group consisting of cereals, grains, and starch containing roots, tubers and stems, either comminuted or in their natural state. The fibrous material is selected from the group consisting of wood chips, plant fibres, cellulose materials, recycled cellulose materials, paper materials and recycled paper materials. When plant fibre materials are used, on the one hand high-grade chip or fibre products are obtained, and on the other hand a great deal of flexibility is possible in the choice of starting components and in the quality of the expanded finished products, whereby in particular economic advantages are also achieved.

If the process temperatures are adjusted, in the extruder to temperatures in excess of 100° C., and in particular in the range of 125–250° C., the amount of internal energy needed to permit a controlled expansion, coupled with the competing solidification of the mass to the desired density, can be applied in a favourable manner to the moisture content. When the pressures are maintained as outlined in this Claim, controlled expansion can be very easily and advantageously attained.

In another preferred processing method the mixture is subjected to a specific mechanical energy input of 0.05–0.7 kWh/kg, and in particular 0.1–0.3 kWh/kg, and no separate device is needed to heat the mass in the extruder; in addition, because the edges, corners and projections on the lumpy, fibre-containing material are rounded-off, the mass takes on a "smooth" consistency, to which reference has already briefly been made, at the nozzle, and this minimizes the problems of extruding masses of melt-like consistency containing coarse filler materials.

"Lightweight" but structurally rigid boards and sections can be advantageously obtained by performing decompression in order to obtain the preferred values in the expansion index of at least 1.1 and preferably 2–8.

When 5–85 wt. %, and preferably 10–50 wt. % biopolymeric binder biopolymeric binder is used in the mixture, a wide range of chip and fibre-containing materials can be used while still attaining the necessary workability of the extrusion mass along with adequate mechanical properties of the lightweight structural elements which are produced.

In order to ensure that the expansion process can be advantageously controlled in a wide variety of ways, a liquid expansion agent which is miscible with water, such as certain alcohols or ketones, may also be added to support the expansion effect of the moisture content in the extrusion mass itself. These alcohols and ketones boil in the range of 70 to 180° C. under atmospheric pressure.

If shaped parts such as boards and sections are produced, in a preferred manner, with water-repellent and thus also anti-microbial modifiers, the products will have a long lifetime but they can still be disposed of at a later date as waste without any problem. For example, by incorporating rubber or silicone molecules, it is possible to produce shaped parts of low density and having a soft but dimensionally stable and even an elastic consistency.

The same holds true for a mixture containing at least one bi- or polyfunctional modifying agent capable of forming cross-linking bridges between the molecules of the binder, under the conditions of extrusion, wherein the modifying agent is selected from the group consisting of short-chained di- or polycarboxylic acids, di- or poly(thi)ols and their derivatives, molecules containing tertiary amino acid groups, and polyphosphoric acids. By using this mixture, the lifetime of the products can be extended, but also in a preferred manner the appearance of the new shaped parts can be modified, by directly incorporating the modifying agents into the molecular structure of the binder.

When the surface of the extruded product made from the molten gel mixture is coated with a peripherally supplied coating mass before the product emerges from the extruder, shaped parts are obtained which differ from the basic parts in that they have, for example, a tough, elastic or other kind of "rind", "skin" or surface layer. The process of applying an adhesive, such as hot cross-linking resins, or similar, which is also referred to in this Claim, may be advantageous if any coating is to be applied after extrusion, as is done in the case of chipboards and structural boards.

Boards, sections, etc. provided with surface finishes—e.g. for decorative purposes—can be advantageously produced in accordance with the present invention, the advantage being that the extrusion device does not have to be modified to permit the addition of a coating mass before the extrusion mass has left the extruder.

By limiting expansion of the part immediately after formation, dimensionally accurate shaped parts may be obtained in an advantageous way, even if unavoidable fluctuations occur in the raw materials used, e.g. their particle size or grain size or the moisture content, etc.

If a surface coating is applied or bonded to boards and sections produced in accordance with the present invention the desired dimensional accuracy of the extrusions is reliably combined in a technically simple and cost-saving manner with the advantages of a surface finish which is exactly matched to the later uses to which the products will be put.

A further important and preferred subject of the invention is a machine for manufacturing the aforementioned shaped parts, with devices for comminuting and/or conditioning and/or pre-mixing the starting components, which are preferably supplied in solid form as lumps or small pieces, along with other devices for feeding these components into an extrusion machine, especially a multi-screw extruder possibly having screws with alternating leads and/or a conical configuration, and having also at least one shape-imparting, preferably rectangular extrusion opening.

This machine is fitted with a means for comminuting, conditioning, and pre-mixing the starting components and also with a means for feeding these components to an extruder having at least one shape-determining extrusion opening. The screw extruder includes means for supplying solid, lump-shaped or small-particled starting components, and being provided upstream of the nozzle with a processing zone in which partial decompression of the mixture is carried out. An extrusion machine of this type offers the advantage that the dimensions of the expanded parts can be controlled with great accuracy and the whole process runs more "smoothly". The partial decompression is achieved by providing appropriate areas in the screw where the lead of the screw is increased, or by providing larger "free" transportation volumes between the rotating screw and the wall of the extruder.

The machine preferably includes a dimension limiting means downstream of the extrusion opening for limiting the spontaneous expansion of the extruded part, wherein the dimension limiting means includes a roller or continuous belt element that can be brought or adjusted to the respective speed of advance of the extruded part. This construction offers the advantage that it is simple in design and construction but is capable of guaranteeing the dimensional stability of the product which is dimensionally not very easy to control during the production process.

In accordance with another aspect of the invention, the dimension limiting means is oriented transverse to the direction of movement of the extruded part and is provided with a non-stick surface that permits the means to rotate at a speed matching the speed of the extruded part. Thus, while the device is simple in design and construction, it is not necessary to provide a separate drive mechanism for moving dimension-limiting elements at a speed conforming to that of the extruded products.

If the surface smoothness or similar of the product has to meet stricter requirements, then a more complex embodiment of the production system may be used, wherein the dimension limiting means is a wall element or endless belt having a non-stick, smooth or structured surface running at essentially the same speed and in the same direction as the extruded part.

A significant reduction in the technical effort which would otherwise be needed for applying a foil coating to the shaped part may be achieved with a variant of the design, wherein a device is provided for continuously feeding product-coating foils into the gap between the surface of the product and the roller of the dimension limiting device at a speed essentially equal to the rate of advance of the extruded part. This construction permits a high degree of dimensional precision to be combined with the surface-finishing technique.

The application of a surface finish other than a foil coating, e.g. a coating mass or a similar kind of powder, precisely at the moment after the product has left the extruder nozzle and the expansion commences and continues, is problematical but the problems involved can be avoided when the machine has several feed pipes discharging close to the nozzle into the exit area of the extruder chamber, wherein the pipes are distributed around the inner periphery of the chamber and supply surface coating and/or gluing media under pressure.

BRIEF DESCRIPTION OF THE DRAWINGS

The invention, and in particular the preferred types of devices needed to accomplish it, will now be described on the basis of the drawings, wherein.

DESCRIPTION OF THE PREFERRED EMBODIMENT(S)

Figure 1:
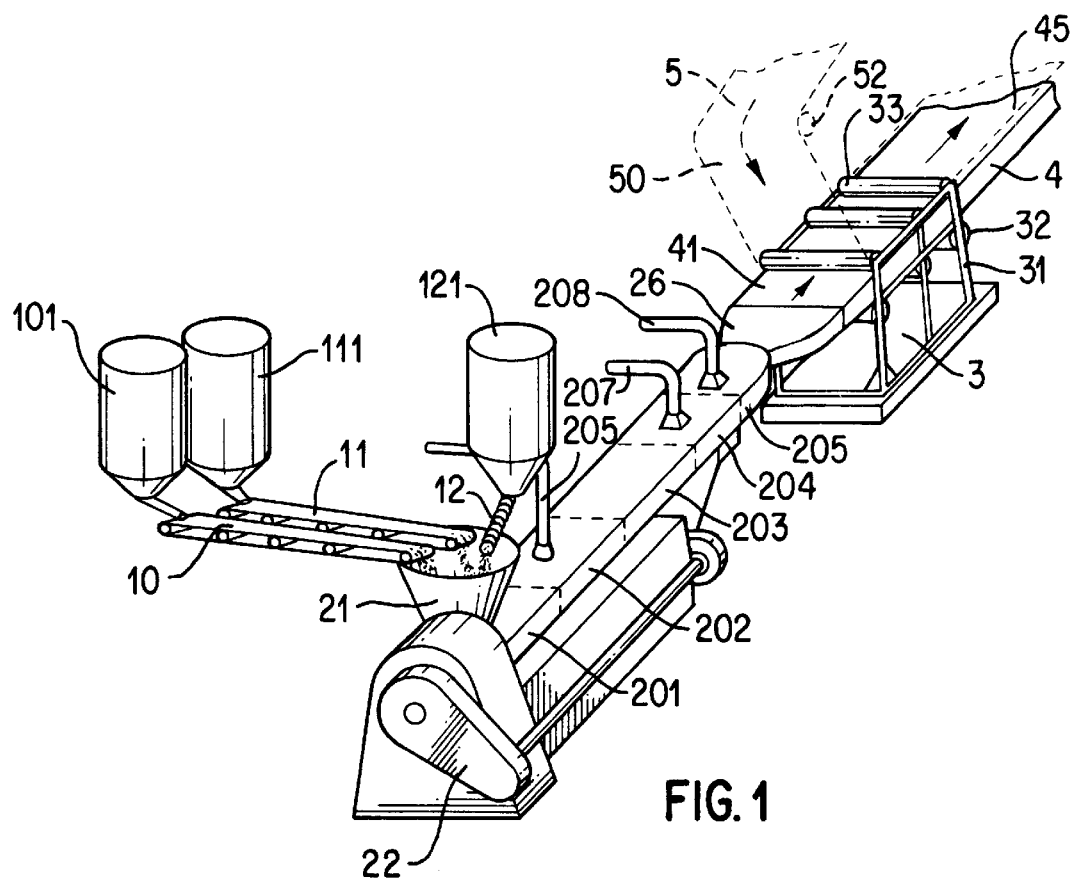
FIG. 1 shows an oblique-angled view of the most important parts of an installation according to the invention for the production of expanded fibre boards, wherein the installation is equipped with a device consisting of rollers for limiting the cross-sectional profile of the products.

According to FIG. 1, wood chips, starch-containing binder and "additives"—all in solid lump form or as small particles—are fed in that order from storage hoppers 101, 111 and 121 via feed belts 10 and 11 and also feed screw 12 into the storage hopper 21 of the extrusion machine 2. From here, the mass is continuously fed into the work chamber of a two-screw extrusion press 2 equipped with drive 22, and premixing of the starting components takes place in the entry zone 201 of the extruder, right after storage hopper 21. In the immediately following sealing zone 202, on the one hand the moisture content is temporarily prevented from converting back into steam, and on the other hand preliminary compaction of the extrusion mass is carried out. Through a pipe 206 leading into this zone 202, water for example can be fed to adjust the desired total moisture content of the mass. In the following extruder zone 203—referred to here as the "shear zone"—the screw is shaped in such a way that it imparts a large amount of energy to the mass while simultaneously greatly increasing the pressure and temperature. The further processing zone 204 which follows after shear zone 203 is equipped with a pipe 207 through which, for example, a hydrophobic agent for the binder is supplied; in this zone the now melted mass is stabilized, binder-modifying agents are added or, however, in this zone the leads of the screw are increased or the number of spirals on the screw is reduced in the case of a multi-spiral screw, with the result that partial, preliminary expansion and also "smoothing" of the extrusion mass takes place here A further pipe 208 leads into the ejection zone 205 adjoining downstream in the material flow; materials such as a hot cross-linking plastic for applying an outer coating to the extruded boards can be added via this pipe to the mass while it is still in its "melt-gel state" in order to modify its surface finish. Finally, the mass is extruded through the—in this case rectangular—heatable extruder nozzle 26 and, as a result of the ensuing decompression, the flat extrusion 4 immediately starts to expand spontaneously as part of the moisture which it contains turns to steam, and the extrusion increases gradually in thickness while the density is reduced in zone 41 after the product leaves the flat nozzle 26.

An extrusion cross-section limiting device 3 is provided to limit the thickness of the boards. The frame 31 in which this device is mounted is advantageously equipped with oppositely arranged, precisely positionable, upper and lower rollers 33 and 32 which can be moved towards each other. The extruded product, which is expanding extremely slowly due to the increase in viscosity brought about by the cooling process, is passed between these rollers and its cross sectional profile is exactly shaped and maintained so that finally an "endless board" of the desired thickness is obtained. The boards are then cut up into portions of the desired size and any necessary finishing, for example the surface application of a hydrophobic agent, or similar, is carried out.

When the surfaces of the preferably silicone-coated or teflon-coated rollers 32 and 33 are appropriately formed, boards with any desired surface structure may be produced.

The broken lines in FIG. 1 also show how a coating foil 50 is passed over a deflection roller 52 of a foil-coating device 5, which is not shown here in any further detail, at the end of the expansion zone 41, then brought into contact with the upper surface of the extruded product 4, and then deflected once more around the first of the upper rollers 33 of the roller frame 3 of the dimension-control device. An "adhesive layer" can be applied to the surface of the extrusion 4 by injecting an adhesive under pressure via the supply line 208 ahead of nozzle 26 into zone 205 of the extruder, e.g. via an annular duct arranged on the inside of the cylinder and opening towards the screws. This adhesive layer serves to bond the foil 50 running through the roller frame 3 firmly to the surface of the board 40, thereby forming a foil coating 45.

A device similar to that shown for feeding foil 50 can, of course, also be provided for coating the underside of the extruded board.

Figure 2:
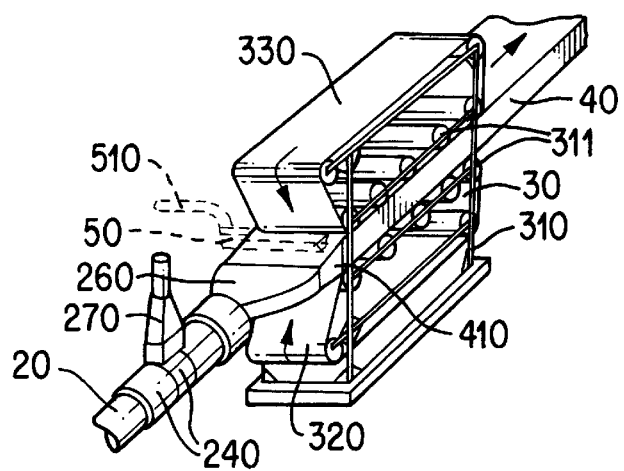
FIG. 2 depicts a section of an installation, also according to the invention, in which the profile-limiting elements consist of wall elements in the form of continuous belts.

The dimension-control device 30 shown in FIG. 2, which is used to limit the cross sectional dimensions of the product, consists of rollers 311 mounted in a frame 310 to guide upper and lower continuous belts 330 and 320 which form an upper and lower "wall element" respectively running continuously in the same direction of travel (see arrow) and at the same speed as the extruded product 4. The belts 330 and 320 may be provided with separate drives to move them at a speed matched to that of the speed of the extrusion or, also, they may be designed as non-driven belts. A surface-coating medium can be supplied via a pipe 280 in the exit area 250 of the cylinder—not shown in detail here—of the extruder 20, close to the flat nozzle 260. Because this coating medium is then extruded together with the extrusion mass it forms an extremely integral bond with the extrusion 40.

The broken lines denote another surface-coating device 50 which is arranged transversely across zone 410 of the extrusion 40 just as it leaves the nozzle 260 and starts to undergo expansion. The lower surface of this device is provided with outlet openings for uniformly distributing a surface-coating medium supplied via feed pipe 510. A similar type of system can, of course, be provided to apply a coating medium to the underside of the extrusion.

It goes without saying that, if the expanded lightweight board 40 is desired to have a structured surface, the continuous belts 330 and 320 may be designed with appropriate surface-texturing elements which should be advantageously coated with a non-stick release agent, as mentioned above.

Finally, the new use of shaped parts for the production of structural elements, e.g. in furniture and structures, and for insulation and/or packaging purposes, is also an important subject of the present invention. These parts are preferably made from fibre-based sections and/or boards in turn obtained from the components described above. Shaped parts produced from the method described above may be used in the manufacture of construction material, furniture material, structural material, insulating material, packaging material, or the like. The preferred shaped part possesses an essentially dense surface and is formed from at least one melted gel mixture which undergoes spontaneous expansion immediately after being extruded and in which small particles of a fibre-containing and/or fibre-shaped biogenic, high-molecular material are distributed within an essentially structure-determining matrix containing a large number of small cavities. The matrix is based on a melt of a binder formed with at least one biopolymeric natural substance taken from at least one of the groups of starches, dextrins, pectins, collagens, proteins or caseins. The melt is hardened following the application of elevated temperature, elevated pressure and/or mechanical stress, and the percentage of the binder is 5–85 wt. %, and preferably 10–50 wt. %, relative to the dry extrusion mass. Such shaped parts possess excellent mechanical strength, are resistant, "lightweight" and easy to manipulate, e.g. they can be cut and sanded without any problem, they may also exist in granulate form, and they have a pleasing outer appearance. They are long-lasting and have an unlimited range of applications extending from construction via interior decor, automobile and other vehicular uses, all the way through to efficient lightweight packaging.

The use of shaped parts which are textured has the advantage that the parts are highly resistant to penetration by fluids, in particular water, and they can therefore be used in areas of elevated relative humidity, e.g. in the tropics, in cellars and basements, or also they are suitable as packaging materials for fresh fruit or meat, especially when they are additionally treated with a hydrophobic agent according to Claim 9. With their foam-like structure, the new shaped parts exhibit especially high strength and a high degree of isotropy as regards their mechanical properties and workability. Shaped parts having the densities mentioned in this Claim are preferred because of their "lightweight" characteristics while still retaining adequate mechanical stability.

The advantages which can be obtained by using shaped parts having a reduced density and coated exceed the advantages already described. In addition to the enhanced surface finish provided by the coating layer, a sandwich effect is also achieved which additionally improves the stability and distortion resistance of the product.

Using in particular board-shaped, expanded, shaped products in accordance with the preferred embodiment offers the advantage that they can be used without any problem in place of the hitherto customarily used particle boards of the same thickness.

The invention will now be explained in more detail on the basis of the following examples:

EXAMPLE 1

Manufacture of an expanded wood fibre board 60 wt. % wood chips between 0 and 3 mm in size having a residual moisture content of 12%, 35 wt. % cassava meal having a residual moisture content of 12% and 5 wt. % tall resin, are fed as solids into a conical double-screw extruder whose operation is adjusted in such a way that the temperature in the mass is 160° C. and the pressure in the mass is 150 bar close to the nozzle. The plastic, gel-like molten mass is extruded through a heatable flat nozzle and converted into a continuous board product by carrying out sudden decompression and adjusting the expansion index to 3, and the product is then transported to other areas of the plant for further processing.

The board product had a dense surface, a thickness of 20 mm, a density of 0.48 t/m$^3$, and a bending strength of 14.2 N/mm$^2$.

EXAMPLE 2

Crushed rice and natural rubber in proportions of 70 wt. % to 29 wt. % were fed continuously into a twin-screw extruder via separate fed mechanisms.

In the area of the sealing zone, water was continuously supplied to the extruder via a feed pipe in such quantities (approximately in the range from 2 to 10 wt. % relative to 99% starting materials) that an extrusion mass having a uniform water content of 14 wt. % was transported into the compression zone of the extruder. Through another feed pipe 1 wt %, relative to the solid starting components, of a 60% aqueous paraffin emulsion was fed into the "further processing zone" of the extruder. During stable, continuous operation the temperature in the mass was 165° C. and the pressure was 200 bar. Products of round cross section were continuously extruded through two circular openings each 1.5 cm in diameter while adjusting the expansion index to 6; then, while the extrusions were still slowly expanding, they were cut up into small spherical granulates using a rotating knife. The pleasant-looking packaging filler obtained in this way was waterproof, and elastic but exhibited high shape-restoring forces and, lastly, possessed good biodegradability when disposed of as waste.

EXAMPLE 3

The same procedure as described in Example 2 was used, the only difference being that apart from crushed rice, up to 70 wt. % less natural rubber than in Example 2 namely 24 wt. %, and an additional 5 wt. % of cellulose as a biogenic fibre material were added to the extruder and a packaging foil material approximately 1.5 mm thick was extruded through a flat nozzle.

An elastics dimensionally stable, low-density non-woven product was obtained which exhibited increasing shape-restoring properties and high tear strength in proportion to increasing application of pressure.

EXAMPLE 4

The following components and conditions were selected for the extrusion process:

| | |
|---|---|
| Potato starch: | 67.5 wt.% |
| Phthalic acid anhydride: | 2.5 wt.% |
| pH value | 8 to 11 (adjusted with 30% strength NaOH) |
| Cellulose (from the paper industry) | 30% |
| Water contet of overall mixture adjusted to | 16 wt. % |

Operating conditions:

| | |
|---|---|
| Expansion index | 4.5 |
| Density | 0.25 t/m$^3$ |
| Temperature of the mass | 150° C. |
| Pressure in the mass | 120 bar |

Boards 3.5 mm thick were obtained and these are ideally suitable for packaging fruit, producing thermal insulating containers for fresh snack foods, etc., but they are still brittle enough to be broken up into smaller pieces when disposed of as waste.

EXAMPLE 5

| An extrusion mass having the composition | |
|---|---|
| Corn semolina | 37 wt. % |
| Polyethylene | 10 wt. % |

| -continued | |
|---|---|
| An extrusion mass having the composition | |
| Softwood chips | 50 wt. % (particle size 1–10 mm) |
| Linseed oil | 3 wt. % | was extruded in a single-screw extruder to give a lightweight chipboard 24 mm thick. The expansion index was 3.0 and the density of the board obtained was 0.3 t/m$^3$.

The operating conditions were as follows:

| | |
|---|---|
| Temperature in the mass | 145° C. |
| Pressure in the mass | 90 bar |

The wood chipboard product obtained in this way was waterproof also under tropical conditions; it possessed a bending strength of 13.8 and was a pleasant yellow-brown in colour.

Although the invention has been described with reference to the preferred embodiment illustrated in the attached drawing figures, it is noted that substitutions may be made and equivalents employed herein without departing from the scope of the invention as recited in the claims.

I claim:

1. A process for manufacturing a shaped material comprising the steps of:

mixing a moist, natural fibrous material and a binder together to form a mixture, wherein the binder is selected from the group consisting of starches, dextrins, pectins, collagens, proteins, and caseins, and wherein the fibrous material is selected from the group consisting of wood fibers, straw, husks, cardboard, and paper;

adjusting a water content of the mixture to 6–25% by weight of the mixture to form an adjusted mixture;

compacting and applying shear forces to the adjusted mixture in a screw extruder to increase pressure and temperature until the binder melts to form a molten gel mixture;

shaping the molten gel mixture by passing the mixture through a shape-imparting nozzle attached to the extruder; and relieving pressure from the molten gel mixture immediately thereafter such that as moisture in the molten gel mixture turns to steam, spontaneous expansion of the molten gel mixture occurs and a structurally rigid fiber or chip-based shaped part selected from the group consisting of structural elements suitable for construction or interior decor, insulation elements, and packaging elements is formed which has a density lower than the overall density of the non-gaseous components of which it is made up but a relatively dense surface.

2. A process according to claim 1, wherein the binder comprises starch and said starch comprises starch-containing plant parts selected from the group consisting of cereals, grains, and starch-containing roots, tubers and stems, either comminuted or in a natural state.

3. A process according to claim 1, wherein the mixture further comprises a liquid expansion agent, which is miscible with water and selected from the group consisting of alcohols and ketones, which boil in a range from 70 to 180° C. under atmospheric pressure.

4. A process according to claim 1, wherein the mixture further contains at least one bi- or polyfunctional modifying agent capable of forming cross-linking bridges between molecules of the binder, under conditions of extrusion, said modifying agent being selected from the group consisting of short-chained di- or polycarboxylic acids, di- or poly(thi)ols and their derivatives, molecules containing tertiary amino acid groups, and polyphosphoric acids.

5. A process according to claim 1, wherein an expansion index of the molten gel mixture after decompression is of a value of 2–8.

6. A process according to claim 1, further comprising a step of coating the molten gel mixture with a coating mass immediately after the molten gel mixture is passed through the nozzle.

7. A process according to claim 1, further comprising a step of limiting expansion of the shaped part to a predetermined cross-sectional dimension.

8. A process according to claim 7, further comprising a step of applying a surface coating to the shaped part as expansion of the part is being limited.

9. A process according to claim 1, wherein a twin-screw extruder is used.

10. A process according to claim 1, wherein a specific mechanical energy input ranging from 0.05–0.7 kWh per kg of the adjusted mixture is imparted to said mixture during the compacting step.

11. A process according to claim 10, wherein a specific mechanical energy input ranging from 0.1–0.3 kWh per kg of said mixture is applied.

12. A process according to claim 1, wherein the pressure is increased to 15–600 bar.

13. A process according to claim 12, wherein the pressure is increased to 20–250 bar.

14. A process according to claim 1, wherein the temperature of the molten gel mixture is increased to at least 100° C.

15. A process according to claim 14, wherein the temperature of the molten gel mixture is increased to 125–250° C. during the compacting step.

16. A process according to claim 1, wherein the mixture contains 10–50 wt. % binder.

17. A process according to claim 1, wherein the molten gel mixture is subjected to a step of pre-expansion immediately before said step of shaping.

18. A process according to claim 1, wherein the density of said shaped part is less than 1 t/m$^3$.

19. A process according to claim 1, wherein the shaped part is elastic and said process further comprises mixing rubber or silicone with the fibrous material and binder to form a shaped part having elastic characteristics.

20. A process according to claim 1, wherein the structurally rigid fiber or chip-based shaped part has a bending strength of at least 7 N/mm$^2$.

21. A process according to claim 1, wherein the structurally rigid fiber or chip-based shaped part has a bending strength of at least 14.5 N/mm$^2$.

22. A process according to claim 1, further comprising adding to said mixture before the shaping step at least one hydrophobicity increasing agent selected from the group consisting of natural oils, synthetic oils, waxes, fats, resins, rubbers, paraffins, silicones, and plastics.

23. A process for manufacturing a shaped material comprising the steps of:
mixing a moist, natural fibrous material with 5 to 85 wt. % of a binder selected form the group consisting of starches, dextrins, pectins, collagens, proteins, and caseins to form a mixture;
adding to said mixture at least one hydrophobicity increasing agent selected from the group consisting of natural oils, synthetic oils, waxes, fats, resins, rubbers, paraffins, silicones and plastics;
adjusting a water content of the mixture to 6–25% by weight of the mixture to form an adjusted mixture;
compacting and applying shear forces to the adjusted mixture in a screw extruder to increase pressure and temperature until the binder melts to form a molten gel mixture;
shaping the molten gel mixture by passing the mixture through a shaped-imparting nozzle attached to the extruder; and
relieving pressure from the molten gel mixture immediately thereafter such that as moisture in the molten gel mixture turns to steam, spontaneous expansion of the molten gel mixture occurs and a structurally rigid, fiber or chip-based shaped part is formed which has a density lower than the overall density of the non-gaseous components of which it is made up but a relatively dense surface.

24. A process according to claim 23, wherein the binder comprises starch and said starch comprises starch-containing plant parts selected from the group consisting of cereals, grains, and starch-containing roots, tubers and stems, either comminuted or in a natural state.

25. A process according to claim 23, wherein the fibrous material is selected from the group consisting of wood chips, plant fibers, cellulose materials, recycled cellulose materials, paper materials and recycled paper materials.

26. A process according to claim 23, wherein the mixture further comprises a liquid expansion agent, which is miscible with water and selected from the group consisting of alcohols and ketones which boil in a range from 70 to 180° C. under atmospheric pressure.

27. A process according to claim 23, wherein the mixture further contains at least one bi- or polyfunctional modifying agent capable of forming cross-linking bridges between molecules of the binder, under conditions of extrusion, said modifying agent being selected from the group consisting of short-chained di- or polycarboxylic acids, di- or poly(thi)ols and their derivatives, molecules containing tertiary amino acid groups, and polyphosphoric acids.

28. A process according to claim 23, wherein an expansion index of the molten gel mixture after decompression is of a value of 2–8.

29. A process according to claim 23, further comprising a step of coating the molten gel mixture with a peripherally supplied coating mass before the molten gel mixture is passed through the nozzle.

30. A process according to claim 23, further comprising a step of limiting expansion of the shaped part to a predetermined cross-sectional dimension.

31. A process according to claim 30, further comprising a step of applying a surface coating to the shaped part as expansion of the part is being limited.

32. A process according to claim 23, wherein a twin-screw extruder is used.

33. A process according to claim 23, wherein a specific mechanical energy input ranging from 0.05–0.7 kWh per kg of the adjusted mixture is imparted to said mixture during the compacting step.

34. A process according to claim 33, wherein a specific mechanical input ranging from 0.1–0.3 kWh per kg of said mixture is applied.

35. A process according to claim 23, wherein the pressure is increased to 15–600 bar.

36. A process according to claim 35, wherein the pressure is increased to 20–250 bar.

37. A process according to claim 23, wherein the temperature of the molten gel mixture is increased to at least 100° C.

38. A process according to claim 37, wherein the temperature of the molten gel mixture is increased to 125–250° C. during the compacting step.

39. A process according to claim 23, wherein the mixture contains 10–50 wt. % binder.

40. A process according to claim 23, wherein the molten gel mixture is subjected to a step of pre-expansion immediately before said step of shaping.

41. A process according to claim 23, wherein the density of said shaped part is less than 1 t/m$^3$.

42. A process according to claim 23, wherein the shaped part is elastic and said process further comprises mixing rubber or silicone with the fibrous material and binder to form a shaped part having elastic characteristics.

43. A process according to claim 23, wherein the structurally rigid fiber or chip-based shaped part has a bending strength of at least 7 N/mm$^2$.

44. A process according to claim 23, wherein the structurally rigid fiber or chip-based part has a bending strength of at least 14.5 N/mm$^2$.

45. A machine for implementing a process according to claim 1 or claim 23, wherein the machine is fitted with means for comminuting, conditioning, and pre-mixing the starting components and also with means for feeding these components to an extruder having at least one shape-determining extrusion opening, the extruder including means for supplying solid, lump-shaped or small-particled starting components, and being provided upstream of the nozzle with a processing zone in which partial decompression of the mixture being processed can be carried out, further comprising a dimension limiting means positioned downstream of the extruder for limiting expansion of the shaped part.

46. A machine according to claim 45, wherein the dimension limiting means includes at least one speed-adjustable roller oriented essentially transverse to a direction of movement of the shaped part and having a non-adhesive surface, the roller being rotatable at a speed matched with a speed of passage of the shaped part.

47. A machine according to claim 46, wherein a surface of at least one roller is textured.

48. A machine according to claim 45, wherein the dimension limiting means includes at least one endless belt that is supported for movement along a run extending in a direction parallel to a direction of movement of the shaped part, the belt having a non-adhesive surface and being movable at a speed matched with a speed of passage of the shaped part.

49. A machine according to claim 48, wherein a surface of at least one endless belt is textured.

50. A machine according to claim 45, further comprising a coating means for placing a coating foil against the shaped part upstream of the dimension limiting means.

51. A machine for implementing the process according to claim 1 or claim 23, wherein the machine is fitted with means for comminuting, conditioning, and pre-mixing the starting components and also with means for feeding these components to an extruder having at least one shape-determining extrusion opening, the extruder including means for supplying solid, lump-shaped or small-particled starting components, and being provided upstream of the nozzle with a processing zone in which partial decompression of the mixture being processed can be carried out, further comprising a plurality of feed pipes upstream of an opening of the extruder, the feed pipes being arranged around a circumference of the extruder, said feed pipes supplying a coating material to the molten gel mixture.

52. A process for manufacturing a material for use in structural elements, insulation and packaging comprising the steps of:

mixing a moist, natural, fibrous material and a binder together, wherein the binder is selected from the group consisting of starches, dextrins, pectins, collagens, proteins, and caseins to form a mixture;

adjusting a water content of the mixture to 6–25% by weight of the mixture to form an adjusted mixture;

compacting and applying shear forces to the adjusted mixture in a screw extruder to increase pressure and temperature until the binder melts to form a molten gel mixture;

shaping the molten gel mixture by passing the mixture through a shape-imparting nozzle attached to the extruder;

relieving pressure from the molten gel mixture immediately thereafter such that as moisture in the molten gel mixture turns to steam, spontaneous expansion of the molten gel mixture occurs and a fiber or chip-based shaped part is formed which has a density lower than the overall density of the non-gaseous components of which it is made up but a relatively dense surface; and coating the molten gel mixture with a peripherally supplied coating mass before the molten gel mixture is passed through the nozzle.

* * * * *